(12) United States Patent
Puzicha et al.

(10) Patent No.: US 8,589,419 B2
(45) Date of Patent: *Nov. 19, 2013

(54) SYSTEM AND METHOD FOR ESTABLISHING RELEVANCE OF OBJECTS IN AN ENTERPRISE SYSTEM

(75) Inventors: Jan Puzicha, Bonn (DE); Thomas Hofmann, Zollikon (CH)

(73) Assignee: Recommind, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,306

(22) Filed: Dec. 20, 2011

(65) Prior Publication Data

US 2012/0102049 A1 Apr. 26, 2012

Related U.S. Application Data

(63) Continuation of application No. 12/783,380, filed on May 19, 2010, now Pat. No. 8,103,678, which is a continuation of application No. 11/653,136, filed on Jan. 11, 2007, now Pat. No. 7,747,631.

(60) Provisional application No. 60/758,777, filed on Jan. 12, 2006.

(51) Int. Cl.
*G06F 17/30* (2006.01)

(52) U.S. Cl.
CPC .............. *G06F 17/30017* (2013.01)
USPC ........................................ 707/749

(58) Field of Classification Search
USPC ............ 707/748, 749, 765, 766; 715/700
See application file for complete search history.

(56) References Cited

U.S. PATENT DOCUMENTS

| | | | |
|---|---|---|---|
| 5,862,325 A | 1/1999 | Reed et al. | |
| 6,233,575 B1 | 5/2001 | Agrawal et al. | |
| 6,539,375 B2 | 3/2003 | Kawasaki | |
| 6,694,329 B2 * | 2/2004 | Murray | 1/1 |
| 6,757,710 B2 | 6/2004 | Reed | |
| 6,999,962 B2 | 2/2006 | Julliard et al. | |
| 7,143,089 B2 | 11/2006 | Petras et al. | |
| 7,657,522 B1 | 2/2010 | Puzicha et al. | |
| 7,747,631 B1 | 6/2010 | Puzicha et al. | |
| 8,024,333 B1 | 9/2011 | Puzicha et al. | |
| 2001/0047290 A1 | 11/2001 | Petras et al. | |
| 2002/0095454 A1 | 7/2002 | Reed et al. | |
| 2002/0099714 A1 * | 7/2002 | Murray | 707/100 |
| 2002/0107853 A1 | 8/2002 | Hofmann et al. | |
| 2003/0217052 A1 | 11/2003 | Rubenczyk et al. | |
| 2006/0020942 A1 | 1/2006 | Ly et al. | |

OTHER PUBLICATIONS

Ana Lelescu et al., Approximate Retrieval from Multimedia Databases Using Relevance Feedback, 1999, IEEE, 215-223.*

(Continued)

*Primary Examiner* — Jean B Fleurantin
(74) *Attorney, Agent, or Firm* — Carr & Ferrell LLP

(57) ABSTRACT

A system, method, and computer program for establishing relevance of objects in an enterprise system is provided. One or more objects are assigned to content associated with an enterprise system. One or more query terms are received from a user. A preliminary relevance of the one or more objects is determined based on the query terms. Ratings are assigned to the one or more objects based on the preliminary relevance. An overall relevance of the one or more objects is established based on the ratings.

22 Claims, 4 Drawing Sheets

(56) References Cited

OTHER PUBLICATIONS

Hang Cui, et al., Query Expansion by Mining User Logs, Jul./Aug. 2003, vol. 15, No. 4, 829-839.*

Cooper et al., OBIWAN—A visual interface for prompted query refinement, Jan. 6-9, 1998, IEEE, vol. 2, 277-285.

Xu et al., Query expansion using local and global document analysis, Aug. 1996, ACM, 4-11.

Grewal et al., A Visual Representation of Search-Engine Queries and Their Results, IEEE, vol. 1, pp. 352-356, 2000.

Non-Final Office Action, Mar. 27, 2012, U.S. Appl. No. 13/211,266, filed Aug. 16, 2011.

Notice of Allowance, Nov. 21, 2012, U.S. Appl. No. 13/211,266, filed Aug. 16, 2011.

* cited by examiner

SYSTEM AND METHOD FOR ESTABLISHING RELEVANCE OF OBJECTS IN AN ENTERPRISE SYSTEM

CROSS-REFERENCES

Cross Reference to Related Applications

This nonprovisional patent application is a continuation application of U.S. patent application Ser. No. 12/783,380, filed on May 19, 2010, now U.S. Pat. No. 8,103,678 entitled "System and Method for Establishing Relevance of Objects in an Enterprise System," which is a continuation application of U.S. patent application Ser. No. 11/653,136, now U.S. Pat. No. 7,747,631, filed on Jan. 11, 2007, entitled, "System and Method for Establishing Relevance of Objects in an Enterprise System," which claims priority to U.S. Provisional Patent Application Ser. No. 60/758,777, filed on Jan. 12, 2006, entitled, "System and Method for Providing Cross Domain Relevance Computation in an Enterprise Search System," of which the disclosures of all are incorporated herein by reference.

This nonprovisional patent application is also related to U.S. patent application Ser. No. 13/211,266, filed on Aug. 16, 2011, entitled "System and Method for Providing Information Navigation and Filtration," which is a continuation application of U.S. patent application Ser. No. 12/641,118, now U.S. Pat. No. 8,024,333, filed on Dec. 17, 2009, entitled "System and Method for Providing Information Navigation and Filtration," which is a continuation application of U.S. patent application Ser. No. 11/653,059, now U.S. Pat. No. 7,657,522, filed on Jan. 12, 2007, entitled "System and Method for Providing Information Navigation and Filtration," which claims priority to U.S. Provisional Patent Application Ser. No. 60/758,900, filed on Jan. 12, 2006, entitled, "Information Navigation and Filtration in an Enterprise Search System," of which the disclosures of all are incorporated herein by reference.

BACKGROUND OF THE INVENTION

1. Field of the Invention

The present invention relates generally to search systems, and more particularly to establishing relevance of objects in an enterprise system.

2. Description of Related Art

Conventionally, a variety of searches may be performed utilizing search systems. Key word searches may be performed, for example. Searches may be performed to search for subject matter, authors, and so forth, as well.

In order to retrieve data, search engines generally perform key word searches. Documents and other content including the key words are then returned to a user.

Various search engines rank results of the various content including the key words. Accordingly, the content is ordered according to the ranked results for the user.

Because key word searches often return a voluminous collection of content based on the key words in the content, other types of searches are sometimes performed.

SUMMARY OF THE INVENTION

A system, method, and computer program for establishing relevance of objects in an enterprise search system is provided. In a method according to one embodiment, one or more objects are assigned to content associated with an enterprise system. One or more query terms are received from a user. A preliminary relevance of the one or more objects is determined based on the query terms. Ratings are assigned to the one or more objects based on the preliminary relevance. An overall relevance of the one or more objects is established based on the ratings.

DESCRIPTION OF EXEMPLARY EMBODIMENTS

A system and method for providing cross domain relevance computation in an enterprise system is provided. Using the cross domain relevance computation, searches may be performed and search results returned based on different classes, types, and so forth associated with one or more objects. Thus, cross domain may include varying classes, categories, types, and so forth associated with the objects, as further discussed herein.

Figure 1:
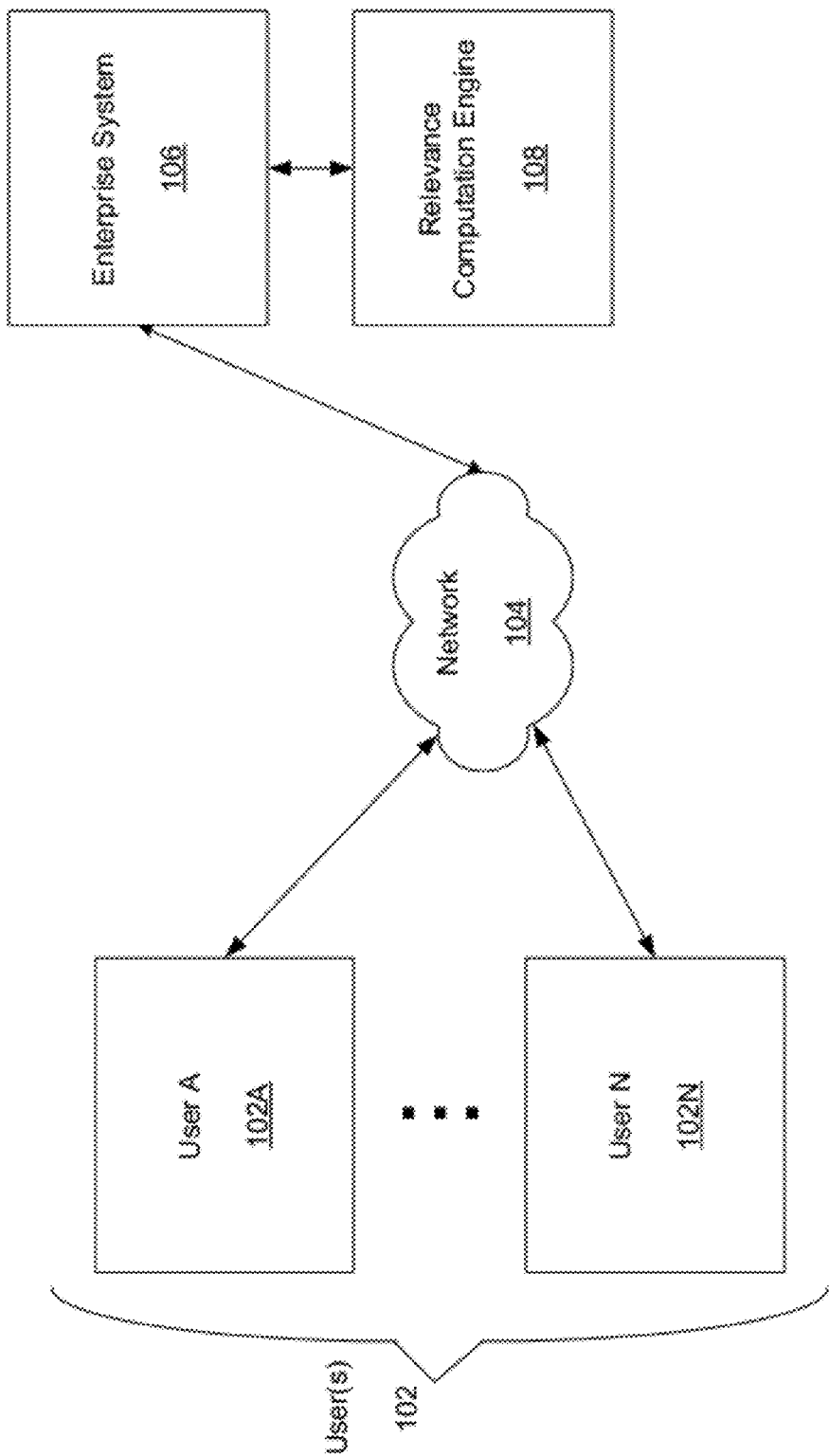
FIG. 1 illustrates a schematic diagram of an exemplary environment for providing cross domain relevance computation.

Referring now to FIG. 1, a schematic diagram of an exemplary environment for providing cross domain relevance computation is illustrated. A user A 102A through a user N 102N communicate via a network 104 with an enterprise system 106. The user A 102A through the user N 102N may communicate with any type of enterprise system. The network 104 may include, for example, the Internet, an Intranet, or any other type of network.

The enterprise system 106 may include content, such as various documents and/or media within an organization that the users 102, such as the user A 102A through the user N 102N, access. For example, in a law firm, the users 102 can access content comprising any number of legal documents, letters, briefs, articles, and so forth that various members of the law firm generate. The enterprise system 106 may be comprised of one or more servers, computing devices, and/or databases that process and/or store the content.

A relevance computation engine 108 is coupled to the enterprise system 106. According to some embodiments, the enterprise system 106 comprises the relevance computation engine 108.

The various types of content may be represented by one or more objects. The relevance computation engine 108 assigns the one or more objects to represent people, matters, documents, and so forth that comprise the content. The relevance computation engine 108 assigns a relevancy rating to each of the objects to indicate a relevancy. The relevance computation engine 108 further assigns connection strengths between the one or more objects that indicate the strength of transitive properties, or relationships, between the one or more objects. The relevancies and the connection strengths may be included in metadata tags associated with each of the objects. The one or more objects are discussed in further detail in association with FIG. 2.

Figure 2:
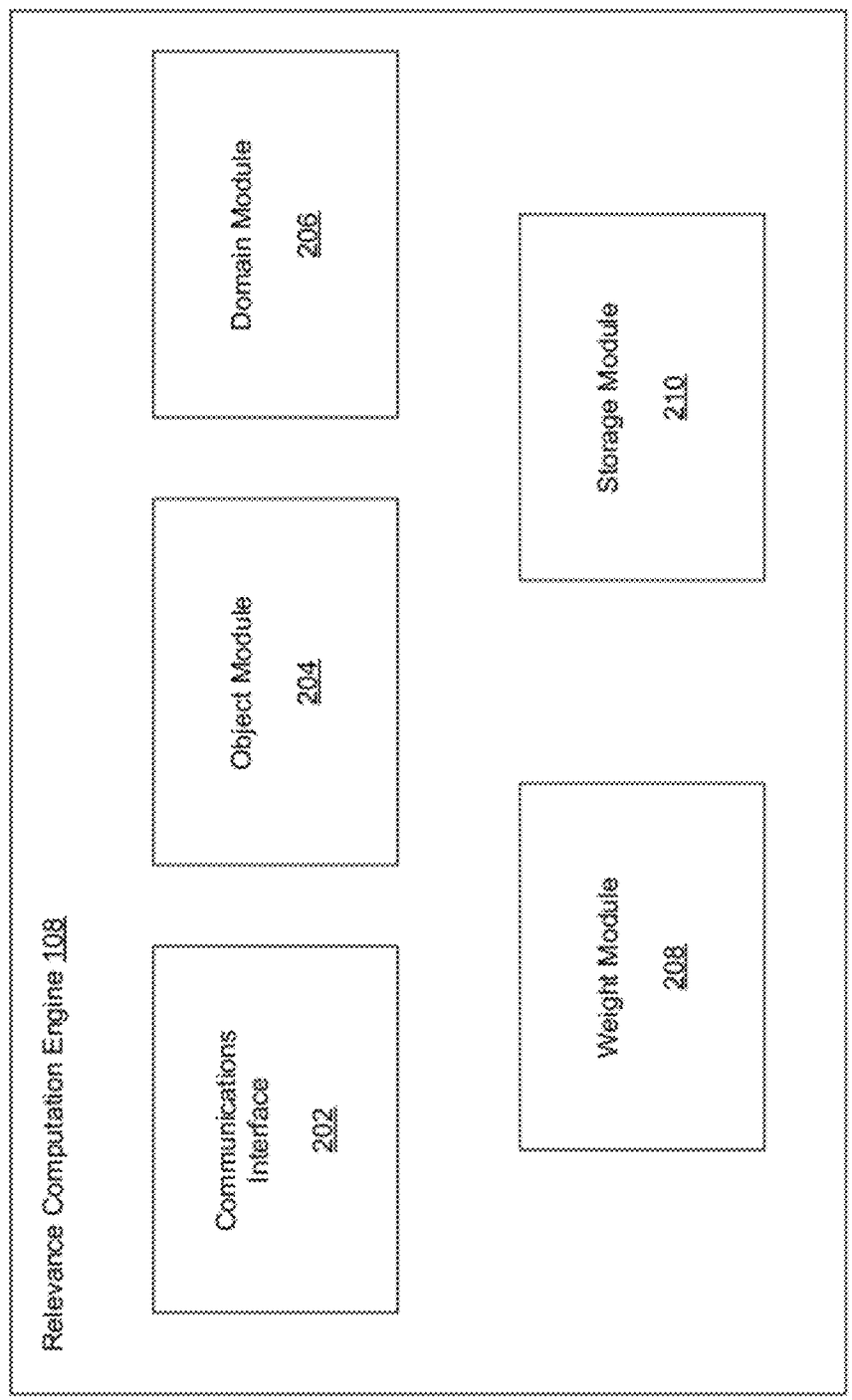
FIG. 2 shows a block diagram of an exemplary relevance computation engine.

FIG. 2 shows a block diagram of an exemplary relevance computation engine, such as the relevance computation engine 108 discussed in FIG. 1. The relevance computation engine 108 may include a communications interface 202. The communications interface 202 facilitates communications between the users 102 that access the enterprise system 106 and the relevance computation engine 108. For example, the communications interface 202 may receive a search request from the user A 102A and return the content as the search results to the user A 102A, via the enterprise system 106. According to alternative embodiments, the users 102 may directly communicate with the relevance computation engine 108.

An objects module 204 (also referred to as object module 204) assigns and/or tracks the one or more objects that represent the content included in the enterprise system 106. The enterprise system 106 may include one or more databases or other information repositories (not shown) that organize the content, as discussed herein. The users 102 communicate with the enterprise system 106 in order to access the content in the databases or the information repositories. The objects module 204 utilizes the one or more objects to represent the content, in order to organize, filter, search, relate, and so forth the content. For example, people, documents, matters, and so forth associated with the enterprise system 106 may each be represented by objects. Thus, a "Jane Do object", a "John Do object", a "client name object", a "document title object", a "corporate department" object, and so forth may exist. Each of the one or more objects may then be listed along with relationships, or transitive properties, to one another by the object module 204.

A domain module 206 may also be associated with the relevance computation engine 108. The domain module 206 assigns a domain to each of the objects from the objects module 204. Each of the objects may belong to a group that represents a specific domain, such as a virtual domain for practice groups, departments, and so forth. For example, the objects may be assigned to a domain for the corporate department and/or the litigation department in a law firm. Any type of domains may be assigned to the groups of objects or utilized to group the objects. The domain module 206 may also include the domain information in the metadata for each of the objects within a particular domain. For example, the "Jane Do object" may include metadata that indicates that the "Jane Do object" is associated with the litigation department because "Jane Do" happens to work in the litigation department.

A weight module 208 assigns relevancies and connection strengths to each of the objects from the object module 204. According to some embodiments, the weight module 208 can also assign weights to the objects based on the domain assigned from the domain module 206. The domain module 206 may assign the domain weight according to other embodiments. For example, two objects may be similarly relevant to a search for "corporate governance", but one of the objects may be assigned a greater weight than the other object because one of the objects actually belongs to the "corporate department domain."

The relevancies are assigned to the objects based on a search inquiry. For example, the user A 102A requests information related to trademark infringement lawsuits. The communications interface 202 receives the query and locates the objects that may be relevant based on relevancies assigned to the objects by the weight module 208 and terms associated with the query.

The weight module 208 can also propagate the relevancies to other objects based on transitive properties between the objects. The weight module 208 assigns connection strengths between the objects to represent the strength of the transitive properties between the objects. For example, an "object A" may be more strongly connected to "an object B" than "an object C", even though they are all related via the transitive properties. Thus, the weight module 208 can help determine which of the objects may be appropriate to return to the user A 102A in response to the query based on the relevancies of the objects, the connection strengths between the objects, and/or the domain weights. As discussed herein, the relevancies, the connection strengths, and the domain weights may be included in the metadata for the objects.

As an example, if the "Jane Do object" indicates that Jane Do authored documents for a trademark infringement suit and the "John Do object" indicates that John Do is strongly related to Jane Do because, for instance, they work on a majority of projects together, the "John Do object" may be deemed relevant by the object module 204, even though John Do has not authored any trademark infringement suit documents. Any type of relevancy, transitive properties, connection strengths, domain weights, and so forth may be utilized to determine whether specific objects represent appropriate search results in response to the query.

A storage module 210 may be included for storing or managing storage of the objects, along with the metadata associated with each of the objects, such as the relevance, the connection strengths associated with the transitive properties, and the domain weights. The objects, the relevance, the connection strengths, and the domain weights may alternatively be stored in a database within the enterprise system 106. Any type of storage may be provided for storing the objects and the metadata associated with the objects with the relevance computation engine 108 and/or the enterprise system 106.

According to exemplary embodiments, the weight module 208 can determine a preliminary relevance of the objects based on search terms from the users 102. Alternatively, the preliminary relevance may be computed based on the relevancy of the object to the search terms, on the transitive properties connection strengths, and/or on the domain weights.

The relevancy for each of the objects is propagated among other objects based on the transitive properties between the objects. Thus, the objects that do not specifically match the search terms from the users 102 may be deemed relevant based on the relevancy that is propagated to the objects based on the transitive properties, or relationships between the objects. Based on the objects that are relevant based on the propagation, the connection strength between the objects, and the domain weights, an overall relevance may be determined. For example, the object module 204 can utilize information from the weight module 208 and/or the domain module 206 to assign an overall relevance to the objects based on the search terms, the relevancies, the connection strengths, and/or the domain weights. The objects with the highest overall relevance may then be returned to the user as the content results for the search.

Specifically, a set of the objects may be determined as relevant based on a preliminary relevance score assigned to the set of objects in response to query terms entered by the user 102. Ratings may then be assigned to the set of objects and/or another set of objects based on the preliminary relevance including propagated relevancies, connection strengths between the objects, and the domain weights of the objects. The ratings may then be utilized to determine an overall relevancy of the objects to the query terms. The objects with the highest overall relevancy may then be returned to the user 102 in response to the query.

The ratings may be based on the preliminary relevance since the preliminary relevance is propagated among the objects based on transitive properties. The connection strength of the transitive properties may also be rated for each of the objects. As discussed herein, the domain weight for each of the objects may also be considered in assigning the rating to each of the objects. Thus, considering the preliminary relevance, which may be based on the query terms, and the overall relevance, which may be based on the ratings, the objects of the result of a search may differ from a set of objects that is returned merely in response to a query term match process, such as a key word search, a search by matter number, and so forth.

The search results, including one or more links to the relevant search results, may then be displayed to the users 102. The users 102 may view the search results in various categories, such as by virtual domains, by key word, by matter number, and so forth. Any type of categories may be utilized for displaying the search results according to various embodiments.

Although the relevance computation engine 108 in FIG. 2 is illustrated as including various modules, such as the communications interface 202, the objects module 204, the domain module 206, the weight module 208, and the storage module 210, fewer or more modules may comprise the relevance computation engine 108 and still fall within the scope of various embodiments. For example, an objects database (not shown) may comprise the relevance computation engine 108.

Figure 3:
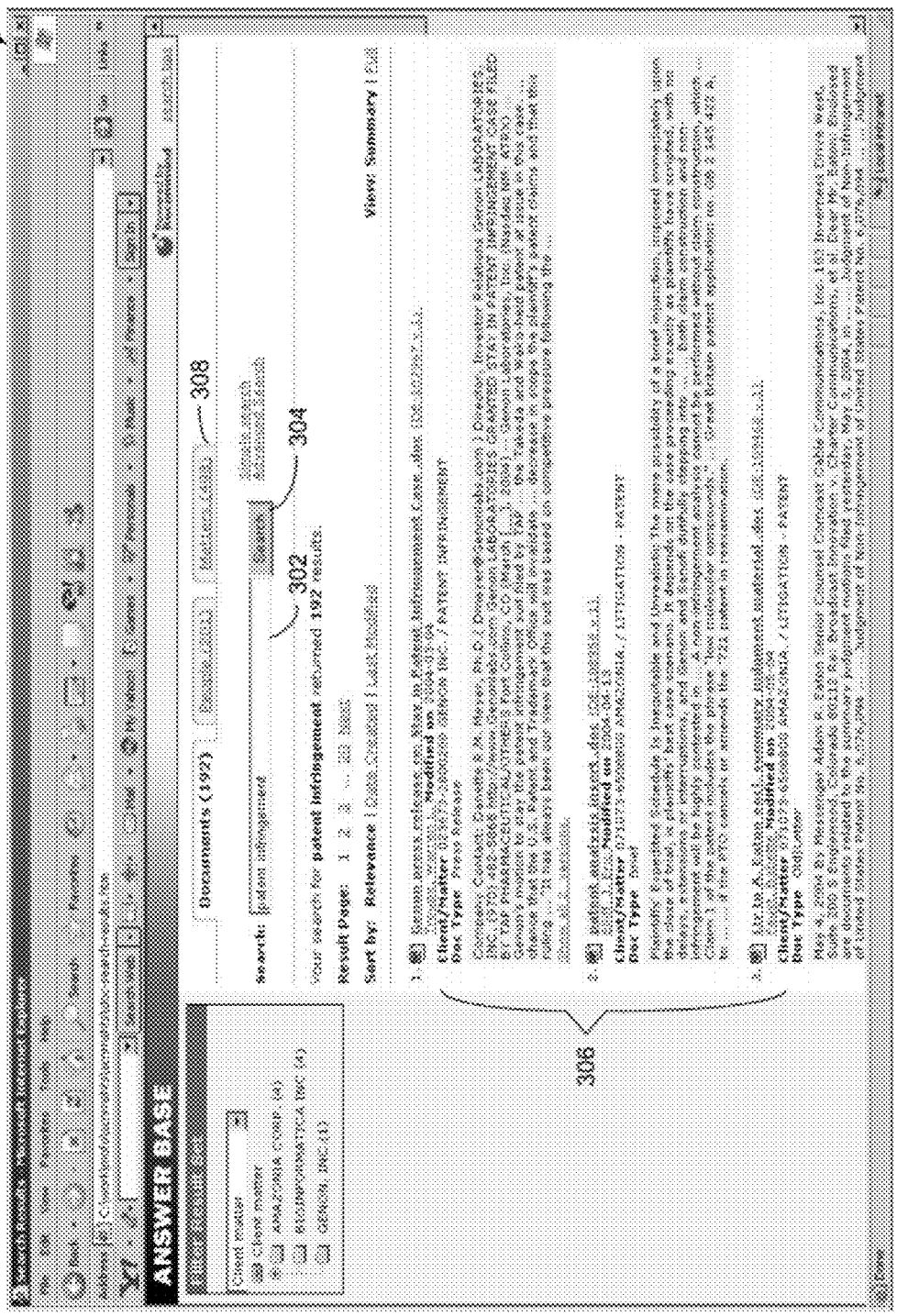
FIG. 3 illustrates a screen shot of an exemplary search results page.

FIG. 3 illustrates a screen shot of an exemplary search results page 300 (also referred to as search result page 300) in accordance with some embodiments. The query terms "patent infringement" have been input in a search box 302. Although the search box 302 is illustrated in FIG. 2, any type of input area may be provided for query terms, such as a pull down menu with predetermined query terms.

The user can select a search button 304 once the query terms have been entered into the search box 302. Once the search button 304, or similar display item for initiating the search, is selected, the relevance computation engine 108 locates the one or more objects that comprise appropriate search results and retrieves search results 306 to return to the user. The search results 306 are displayed on the result page 300 with links to the documents, matters, people, and so forth described in the search results 306. Any number of search results 306 may be displayed in response to the query.

As discussed herein, the query terms are utilized to determine a preliminary relevance of the one or more objects. The one or more objects are associated with the content and describe the documents, the people, the matters, the media, and so forth making up the content. The relevance of the one or more objects may be propagated to other objects based on transitive properties. The objects module 204 may consider the connection strengths of the transitive properties, the relevancies of the objects, and/or the domain weights for each of the objects to compute an overall relevancy of each of the objects. The objects with the highest overall relevancy may then be deemed to be the best search results to the query from the user 102.

In FIG. 3, for example, the relevance computation engine 108 utilizes the terms "patent infringement" to compute relevancy of the objects based on the actual terms "patent infringement," on metadata associated with the terms "patent infringement," and/or on metadata generated as a result of propagating relevancies between the objects. The relevance computation engine 108 may return the search results 306 for any and all categories, such as documents, people, and matters. For example, in FIG. 3, tabs 308 for each of the categories are illustrated.

The tabs 308 near the top of the result page 300 allow the user to display the search results 306 according to the various categories. The categories may correlate with virtual domains according to some embodiments. Any type of categories and/or tabs 308 may be provided according to some embodiments. Each of the tabs 308 in FIG. 3 includes the categories and a number of hits or a number of the search results 306 corresponding with each category.

The content displayed as part of the search results 306 in FIG. 3 may be accessed by clicking on the title of the content, or by any other mechanism. A document snapshot page, for example, may be accessed by clicking on the title of the documents, or other content, in the search results 306. Any type of content may be provided via the enterprise system 106, as discussed herein, such as press releases, articles, and so forth. Any type of details about the content, such as people associated with the content, websites associated with the content, subject matter associated with the content, and so forth may be displayed by accessing the content.

A snapshot of a person associated with the content may be displayed by accessing the tabs 308 for the category entitled "people", for example. A snapshot of the person may include any type of data about a person associated with the content. For example, a photograph and biographical data about the person in the snapshot may be displayed. Other data, such as the office location, phone number, email address, languages spoken, hire date, or any other data may also be displayed, according to exemplary embodiments.

Matter snapshots may also be displayed by accessing the tabs 308 for the category entitled "matters", for example. The matter snapshots can include any information about a client matter associated with the search results 306, a listing of the client matters related to the search terms "patent infringement", a listing of hours billed towards specific matters, industry, total hours billed, responsible attorney, date the matter was opened, other documents related to the matter, and so forth.

By utilizing metadata from various areas, such as accounting, management, client, matters, practice areas, customer relationship management data, support libraries, and so forth, along with terms associated with the query, the search results 306 can be provided that indicate relationships, relevancies, and so forth that may not be revealed by a standard key word search. Thus, a responsible attorney for a patent infringement opinion may not be identified via a standard key word search since the words "patent infringement" may not appear within the object created for the responsible attorney. However, because billing records and other attorney records indicate that the responsible attorney worked on matters concerning an opinion for patent infringement, the responsible attorney may comprise part of the search results 306 returned to the user in response to the "patent infringement" query.

Although figures discussed herein refer to attorneys and attorney matters, cross domain relevance computation in the enterprise system 106 may be utilized for any search system. For example, accountants, doctors, and so forth may utilize the cross domain relevance for locating documents, people, matters, projects, and so on related to their businesses.

Further, cross domain relevance computation may be utilized in any environment, such as via the Internet or any other network for locating objects to return as content comprising the search results 306. In some embodiments, a user can specify an industry, profession, etc. for searching public records. For example, the user may search for environmental cases in the legal industry by firm name via the Internet.

Figure 4:
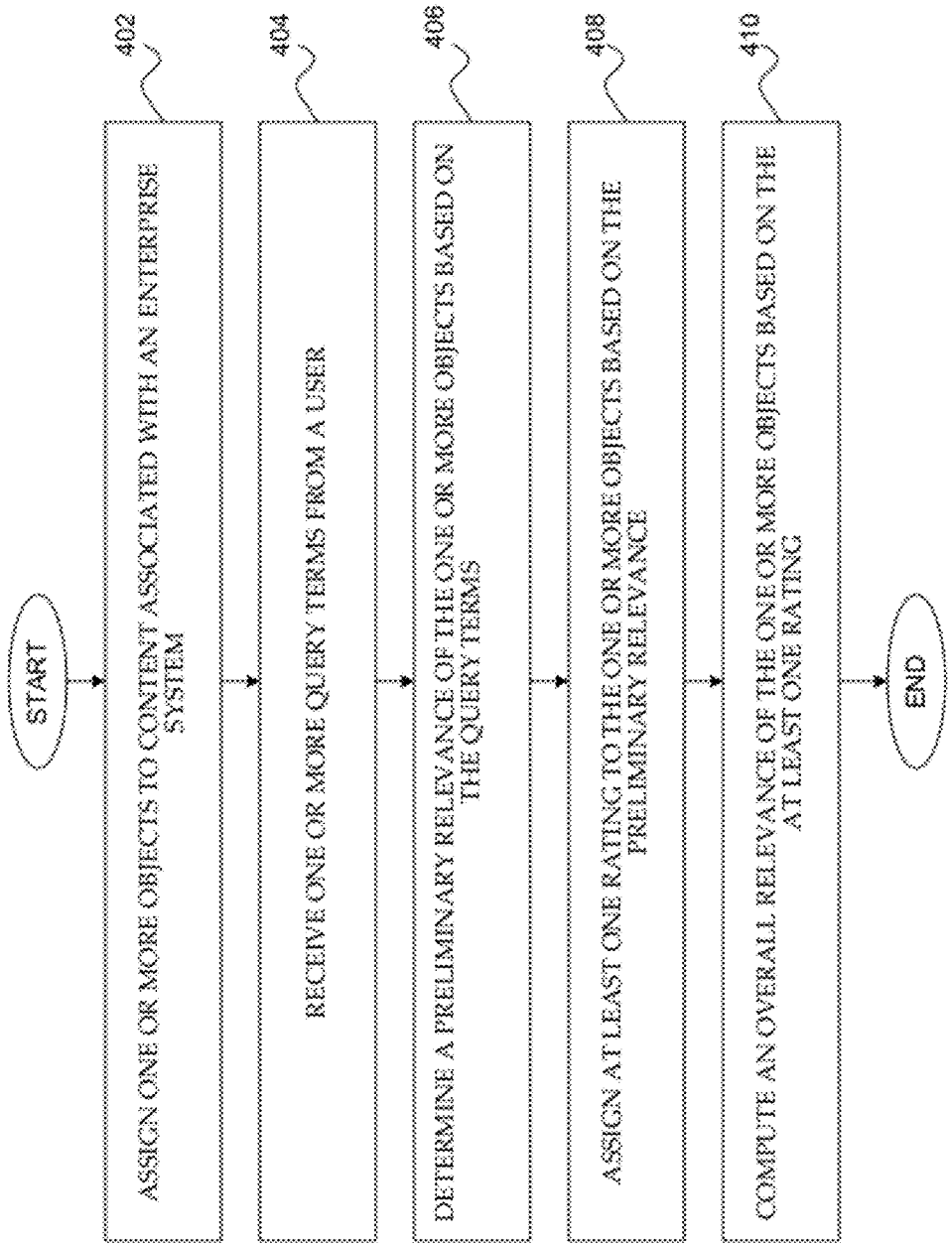
FIG. 4 illustrates a flow diagram of an exemplary process for providing cross domain relevance computation in an enterprise system.

Turning to FIG. 4, a flow diagram of an exemplary process for computing cross domain relevance in an enterprise system, such as the enterprise system 106 shown in FIG. 1, is illustrated. As discussed herein, by utilizing cross domain relevance computations, the content in the enterprise system 106 can be searched for, filtered, organized, and so forth based on relevancies rather than only query term matches with the content.

At step 402, one or more objects are assigned to content associated with an enterprise system, such as the enterprise system 106 discussed herein. As discussed herein, the enterprise system 106 may include databases or information repositories for storing the content, one or more servers, one or more computing devices, and so forth. The relevance computation engine 108 in communication with the enterprise system 106 organizes the content, such as by assigning the one or more objects to the content.

As discussed herein, each of the objects can represent people, matters, documents, subject matter, domains, and so forth. The object module 204 may assign the objects to the content, as discussed herein. Each of the objects may have metadata associated with the objects. The metadata may include transitive properties for the objects. The transitive properties may be associated with each of the objects based on object to object relationships, relationships of metadata associated with a single object, or based on a search. For example, a "Jane Do object" may be related to the "John Do object" because Jane Do and John Do author many documents together. However, the "Jane Do object" may not be related to the "Matter ABC object" until a search requests documents for the "matter ABC," which John Do has worked on. By virtue of the transitive properties between the "Jane Do object", the "John Do object", and the "Matter ABC object", the "Jane Do object" may be deemed relevant to the document request for the "matter ABC." In this example, but for the search request, the relation between the "Jane Do object" and the "Matter ABC object", by virtue of the relationship between the "Jane Do object" and the "John Do object", may be generally irrelevant. The object module 204 may associate the metadata with each of the objects, according to some embodiments.

At step 404, one or more query terms are received from a user. For example, the communications interface 202 can communicate the query terms from the user 102 and the enterprise system 106 to the various other modules (e.g., the object module 204, the domain module 206, the weight module 208, and the storage module 210) associated with the relevance computation engine 108.

Any type of query terms may be entered by the user, such as the user A 102A through the user N 102N discussed herein. The users 102 may first login to the enterprise system 106 according to some embodiments. FIG. 3 illustrates an exemplary search results page 300 that shows search box 302. The enterprise system 106 can communicate the query terms to the relevance computation engine 108 to locate the objects that comprise the content that the enterprise system 106 returns to the user as the search results, such as the search results 306 discussed in FIG. 3.

At step 406, a preliminary relevance of the one or more objects is established based on the query terms. For example, the weight module 208 associated with the relevance computation engine 108 can determine a preliminary relevance of the one or more objects utilizing the query terms, such as by matching the query terms to terms associated with the one or more objects. The query terms may be associated with the one or more objects via the metadata, according to exemplary embodiments. For example, the metadata may include authors, matter numbers, relevancy propagations, connection strengths of the transitive properties, domains, domain weights, and so forth associated with the objects.

The query terms may be matched with terms appearing within the objects, such as document objects, themselves. For example, if the user 102 entered the query terms "trademark", the documents with "trademark" appearing within the text of the documents may comprise the objects determined to be preliminarily relevant to the query terms entered by the user 102. According to some embodiments, the preliminary relevance is based on matching the query terms with terms directly associated with the objects.

At step 408, at least one rating is assigned to the one or more objects based on the preliminary relevance. For example, the weight module 208 can assign the at least one rating to the one or more objects by first propagating the relevancy between the objects. As discussed herein, the ratings may be comprised of propagated relevancies from other objects, the connection strengths between the objects, and the domain weight associated with a domain to which each object is assigned. The connection strengths and the domain weights may also be assigned by the weight module 208, as discussed herein. Thus, the preliminary relevance of each object may be propagated among the other objects, as discussed herein.

At step 410, an overall relevance of the one or more objects is established based on the at least one rating. For example, the overall relevance may be computed or established by the weight module 208 utilizing the preliminary relevance, the propagated preliminary relevance, the connection strengths between the objects, and the domain weights for each of the objects. As discussed herein, a set of the one or more objects may be located based on the preliminary relevance comprising a query term match with text associated with the set of the one or more objects, a query term match with metadata associated with the set of the one or more objects, and so forth. The set of the one or more objects may then be narrowed or modified based on the overall relevancy established based on the ratings of the one or more objects.

As discussed herein, metadata may be associated with the one or more objects. For example, the objects module 204 may associate the metadata with the objects. The objects module 204 may also associate the at least one rating with the metadata, such as the preliminary relevancy, the connection strength between the objects, and the domain weight for each of the objects. As discussed herein, the domain module 206 may categorize the one or more objects according to one or more domains.

A weighted sum may be utilized to establish the overall relevance of the objects. As discussed herein, the objects may also be grouped into one or more domains. In exemplary embodiments, the following algorithm may be utilized:

$$OR(o, q) = \sum_d w_d \sum_a w_a c_{oa} R(a, q)$$

It should be noted that the foregoing algorithm is set forth for illustrative purposes only and should not be construed to limit the various embodiments in any manner. In the exemplary algorithm, the index "d" runs over the various domains, and "$w_d$" is a domain-specific weighting factor that expresses how much relevancy is contributed/propagated from each of the domains associated with the one or more objects. The object index "a" runs over the associated objects in the dimension. According to some embodiments, it is assumed that an object is associated to itself, with some given association strength. "$w_a$" is another domain specific weighting factor. The factors "$c_{ao}$" express the connection strength between objects "a" and "o" where "o" is one instance of the object. "q" indicates the dependency on a specific query. Thus, to compute the overall relevance for the object, the relevancies from the objects are propagated, weighted by the connection strength between the objects, and weighted by a dimension specific factor.

The search results, such as the search results 306 discussed in FIG. 3, may then be returned to the user 102. The overall relevance may determine the order in which the search results 306 are displayed to the user, for example. For example, stronger connections between certain of the objects may result in higher overall relevancies of the objects, so that the objects are higher on the list of the search results 306.

However, as discussed herein, any type of weight may be assigned to the objects and/or the domains. In some embodiments, the weight of the object is unaffected by the domain to which the object may be assigned. According to some embodiments, the objects may not be associated with domains according to other embodiments.

As discussed herein, cross domain relevance computation in the enterprise system 106 may be utilized in any enterprise search system, such as for an accounting company, a medical practice, a legal practice, or any other entity or company. The cross domain relevance computation in the enterprise system 106 may be utilized for searching, managing, and/or organizing documents, peoples, matters, and so forth.

According to some embodiments, a query related to one or more objects is received, such as the objects assigned by the object module 204. As discussed herein, the user 102 can enter query terms into a search page associated with the enterprise system 106 and/or the relevance computation engine 108.

A preliminary relevance to the query is computed for the one or more objects based on at least one term associated with the query. Thus, the preliminary relevance may be based on the query terms entered by the user. The query terms may be matched with the objects, themselves, or with metadata associated with the objects, as discussed herein.

The preliminary relevance may then be propagated between the one or more objects. For example, the relevance for an "object A" may be associated with an "object B" and an "object C" because the "object A" is related to "object B" and "object C" based on metadata, such as matter similarities, department similarities, and so forth. The relevance of the "object B" and the "object C" may not be as strong as the relevancy of the "object A" to the query terms. Thus, the relevancy may also be assigned a ranking or rating. The connection strength between the "object A", the "object B", and the "object C" may also be assigned and be comprised within the rating. Further, a weight may be assigned to the domains to which the "object A", the "object B", and the "object C" each belong. The weights may vary based on how the domains relate to the query terms, for example. The at least one rating that may be assigned to the objects based on the preliminary relevance comprises, the relevancies, the connection strengths, and the domain weights, as discussed herein. An overall relevance based on the propagation is then established, as also discussed herein. Search results to the query may then be based on the overall relevance.

While various embodiments have been described above, it should be understood that they have been presented by way of example only, and not limitation. For example, any of the elements associated with the relevance computation engine 108 may employ any of the desired functionality set forth hereinabove. Thus, the breadth and scope of a preferred embodiment should not be limited by any of the above-described exemplary embodiments.

What is claimed is:

1. A method for establishing relevance of objects in an enterprise system comprising:
    assigning one or more objects to content associated with an enterprise system;
    receiving one or more query terms from a user;
    determining, by a processor, a preliminary relevance of the one or more objects based on the query terms;
    assigning at least one rating to the one or more objects based on the preliminary relevance, the at least one rating comprising a domain weight associated with the one or more objects; and
    establishing an overall relevance of the one or more objects based on the at least one rating.

2. The method recited in claim 1, further comprising associating metadata with the one or more objects.

3. The method recited in claim 2, further comprising associating the at least one rating with the metadata.

4. The method recited in claim 2, wherein the determining of the preliminary relevance of the one or more objects is further based on at least one second preliminary relevance of at least one second object, the at least one second object having associated second metadata having at least one similarity with the metadata of the one or more objects.

5. The method recited in claim 1, further comprising categorizing the one or more objects according to one or more domains.

6. The method recited in claim 5, wherein the domain weight associated with one of the one or more objects is based on the domain in which the one of the one or more objects is categorized.

7. The method recited in claim 1, further comprising returning search results to the user based on the overall relevance.

8. The method recited in claim 1, wherein the at least one rating comprises connection strengths between the one or more objects.

9. The method recited in claim 1, wherein the domain weight associated with the one or more objects is based on the query terms.

10. A system for establishing relevance of objects in an enterprise system comprising:
    an object module configured to assign one or more objects to content associated with an enterprise system;
    a communications interface configured to receive one or more query terms from a user; and
    a weight module configured to run on a processor to determine a preliminary relevance of the one or more objects based on the query terms, to assign at least one rating to the one or more objects based on the preliminary relevance and a domain weight associated with the one or more objects, and to establish an overall relevance of the one or more objects based on the at least one rating.

11. The system recited in claim 10, wherein the object module is further configured to associate metadata with the one or more objects.

12. The system recited in claim 11, wherein the object module is further configured to associate the at least one rating with the metadata.

13. The system recited in claim 10, further comprising a domain module configured to categorize the one or more objects according to one or more domains.

14. The system recited in claim 10, wherein the communications interface is further configured to return search results to the user based on the overall relevance.

15. The system recited in claim 10, wherein the at least one rating comprises connection strengths between the one or more objects.

16. A non-transitory computer readable medium having recorded thereon a computer program, the computer program having instructions for establishing relevance of objects in an enterprise system, the instructions comprising:
   assigning one or more objects to content associated with an enterprise system;
   receiving one or more query terms from a user;
   determining a preliminary relevance of the one or more objects based on the query terms;
   assigning at least one rating to the one or more objects based on the preliminary relevance, the at least one rating comprising a domain weight associated with the one or more objects; and
   establishing an overall relevance of the one or more objects based on the at least one rating.

17. The non-transitory computer readable medium recited in claim 16, further comprising associating metadata with the one or more objects.

18. The non-transitory computer readable medium recited in claim 17, further comprising associating the at least one rating with the metadata.

19. The non-transitory computer readable medium recited in claim 16, further comprising categorizing the one or more objects according to one or more domains.

20. The non-transitory computer readable medium recited in claim 16, further comprising returning search results to the user based on the overall relevance.

21. The non-transitory computer readable medium recited in claim 16, wherein the at least one rating comprises connection strengths between the one or more objects.

22. A method comprising:
   receiving a query related to one or more objects;
   computing, by a processor, a preliminary relevance to the query for the one or more objects based on at least one term associated with the query;
   propagating the preliminary relevance between the one or more objects;
   obtaining an overall relevance based on the propagation and a domain weight associated with the one or more objects; and
   ranking search results to the query based on the overall relevance.

* * * * *